US011923561B2

(12) United States Patent
Moore et al.

(10) Patent No.: US 11,923,561 B2
(45) Date of Patent: Mar. 5, 2024

(54) ELECTROCHEMICAL POUCH CELL WITH MECHANICALLY STABILIZED HEADSPACE

(71) Applicant: ZAF ENERGY SYSTEMS, INCORPORATED, Bozeman, MT (US)

(72) Inventors: Randy Moore, Joplin, MO (US); Shiloh J. Williams, Joplin, MO (US); Adam Weisenstein, Bozeman, MT (US)

(73) Assignee: ZAF Energy Systems, Incorporated, Bozeman, MT (US)

( * ) Notice: Subject to any disclaimer, the term of this patent is extended or adjusted under 35 U.S.C. 154(b) by 0 days.

(21) Appl. No.: 17/709,005

(22) Filed: Mar. 30, 2022

(65) Prior Publication Data

US 2023/0318144 A1 Oct. 5, 2023

(51) Int. Cl.
*H01M 50/474* (2021.01)
*H01M 50/178* (2021.01)
*H01M 50/477* (2021.01)
*H01M 50/54* (2021.01)

(52) U.S. Cl.
CPC ....... *H01M 50/474* (2021.01); *H01M 50/178* (2021.01); *H01M 50/477* (2021.01); *H01M 50/54* (2021.01)

(58) Field of Classification Search
CPC .. H01M 50/474; H01M 50/178; H01M 50/54; H01M 50/477
See application file for complete search history.

(56) References Cited

U.S. PATENT DOCUMENTS

| 10,707,464 | B2 | 7/2020 | Freiman et al. | |
| 2002/0061434 | A1* | 5/2002 | Holden | H01M 10/121 |
| | | | | 429/83 |
| 2007/0231685 | A1* | 10/2007 | Takeuchi | H01M 50/126 |
| | | | | 429/163 |
| 2016/0020452 | A1* | 1/2016 | Choi | H01M 50/55 |
| | | | | 429/53 |
| 2017/0271707 | A1* | 9/2017 | Sasakawa | H01M 10/0585 |
| 2020/0328388 | A1 | 10/2020 | Freiman et al. | |
| 2020/0365953 | A1* | 11/2020 | Pham | H01M 50/116 |

* cited by examiner

*Primary Examiner* — Lingwen R Zeng
(74) *Attorney, Agent, or Firm* — Brooks Kushman P.C.

(57) ABSTRACT

A pouch cell includes an electrode assembly and a body forming a gas headspace within the pouch. Tabs of the electrode assembly may extend through or around the body and out of the pouch. Gas from the electrode assembly may collect in the gas headspace. The body may accommodate a vent mechanism that also extends out of the pouch.

5 Claims, 7 Drawing Sheets

ELECTROCHEMICAL POUCH CELL WITH MECHANICALLY STABILIZED HEADSPACE

TECHNICAL FIELD

This disclosure relates to electrochemical pouch cells including an electrode assembly having a negative electrode, a positive electrode, and a separator all bathed in an electrolyte, a pouch encapsulating the electrode assembly, and a rigid body forming a gas headspace within the pouch.

BACKGROUND

Many types of battery chemistries utilize a pouch cell format due to the lightweight, thin, robust, and inexpensive nature of the enclosure.

SUMMARY

A battery cell includes a pouch, a member disposed within and adjacent to an end of the pouch, and an electrode assembly disposed within the pouch and in contact with the member such that the member spaces the electrode assembly away from the end. The electrode assembly includes at least one tab that extends through the member or around the member, and out of the pouch.

DETAILED DESCRIPTION

Embodiments are described herein. It is to be understood, however, that the disclosed embodiments are merely examples and other embodiments may take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art.

Various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Electrochemical pouch cells are typically limited in the amount of gas that can be contained within the pouch because the sides thereof fit tight around the electrodes and tabbing to maximize the battery performance per area. The absence of a headspace can also limit any recombination of hydrogen and oxygen by either a catalyst or direct recombination. Typically, an electrode stack is confined by a three-layer conformable pouch made from two polymer layers with an aluminum foil in between. The pouch is typically molded tightly to the edge of the electrode stack to maximize specific energy and energy density. However, this design limits the headspace or free gas volume in the pouch and can cause issues associated with pressure build up.

Due to the conformal nature of the pouch, an inert, porous, and/or rigid mechanical structure can be introduced into the top of the stack or the headspace to create the needed free volume for gas to collect, recombination to occur, and an electrolyte reservoir if needed. This headspace, in some examples, is created by inserting an inert, hydrophobic, porous, and/or rigid member above the electrode stack to relieve pressure build up in the electrode stack and to provide structural strength to the pouch. Once this headspace support structure is positioned about the electrode stack, the pouch can be formed around the assembly. The inert, porous, and/or rigid member material can be comprised of carbon, ceramic, metal, polymer, or combinations thereof. The headspace support structure can also be an expanded or corrugated material, felt, foam, or sponge with single or multiple layers. The design of the structure can also encompass the headspace with a free internal cavity.

The pouch cell may include a separator assembly disposed between a positive electrode and negative electrode in contact with an electrolyte. The positive electrode can be composed of, but not limited to, manganese dioxide, nickel hydroxide, silver oxide, sulfur, lithium ion manganese oxide, lithium iron phosphate, lithium nickel manganese cobalt, lithium cobalt, or air catalyst. The negative electrode can be composed of, but not limited to, calcium zincate, zinc, zinc oxide, iron, carbon, sodium, $NaTi_2(PO_4)_3$, or $Na_3MnTi(PO_4)_3$, aluminum, or lithium. The electrolyte can contain, but not limited to, hydroxides (e.g., potassium hydroxide, sodium hydroxide, lithium hydroxide, indium hydroxide, cesium hydroxide, rubidium hydroxide), sulfates (e.g., lithium sulfate, sodium sulfate, zinc sulfate), sulfonates (e.g., manganese triflate, zinc triflate), chlorides (e.g., lithium chloride, zinc chloride), chlorates (e.g., lithium perchlorate, sodium perchlorate, zinc chlorate), acetates (e.g., potassium acetate, sodium acetate, zinc acetate), water, ionic liquids, and/or organic solvents (e.g., ethylene carbonate, dimethyl carbonate, diethyl carbonate).

One example includes an inert, porous, and rigid body comprised of a polyethylene foam placed at the top of an electrode stack that includes assemblies of a separator disposed between a positive electrode and negative electrode in contact with an electrolyte. A pouch encompasses the polyethylene foam and electrode stack to form a pouch cell.

A second example includes an inert, porous, and rigid body comprised of a polytetrafluoroethylene perforated sheet placed at the top of an electrode stack that includes assemblies of a separator disposed between a positive electrode and negative electrode in contact with an electrolyte. A pouch is then formed around the polytetrafluoroethylene perforated sheet and electrode stack. Other examples are also contemplated.

Figure 1A:
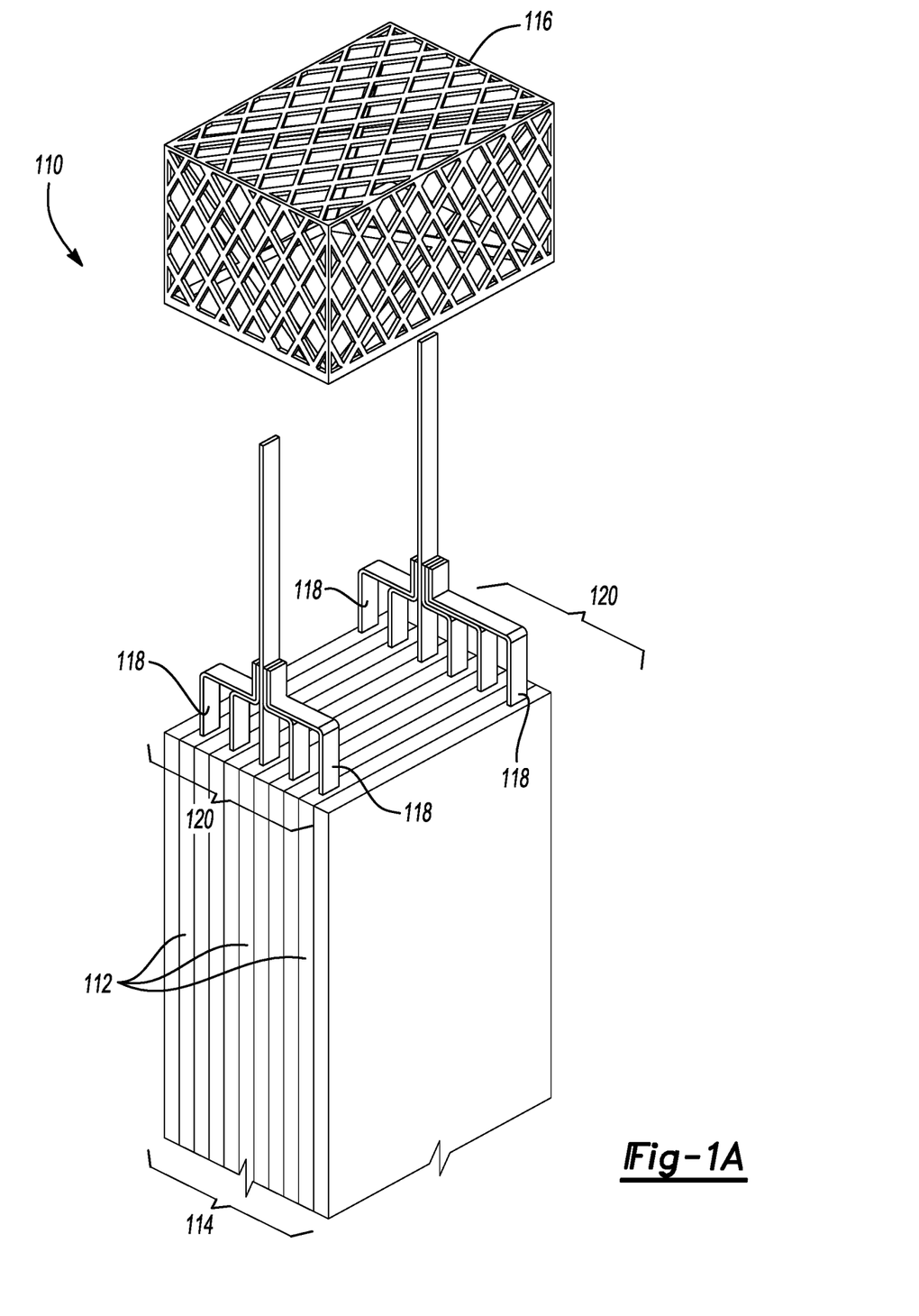
FIGS. 1A and 1B are respectively exploded and assembly views of a cell structure including a headspace cage.
Figure 1B:
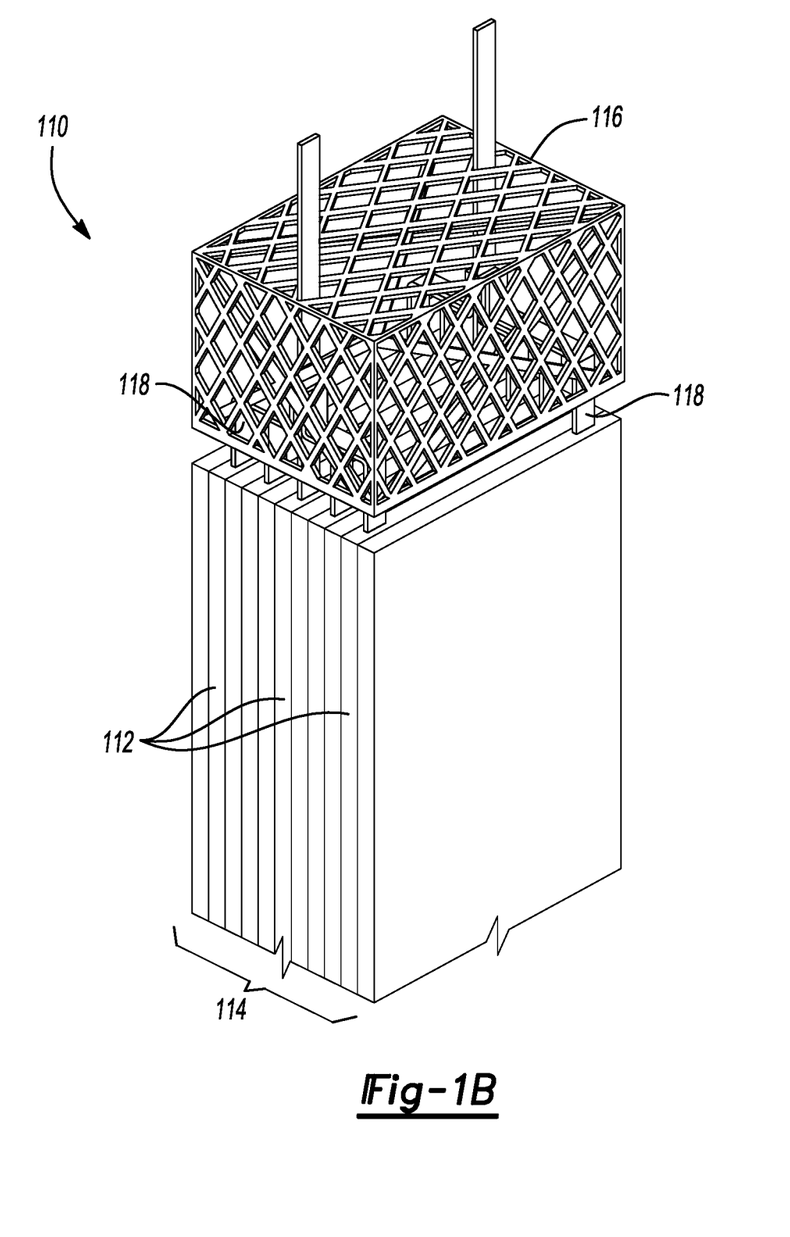

Referring to FIGS. 1A and 1B, a battery cell assembly 110 includes a plurality of electrodes 112 stacked to form an electrode assembly 114, and an expanded metal headspace cage 116. The electrodes 112 have a plurality of tabs 118 extending from a same end thereof. In this example, the tabs 118 are of different lengths and all but one on each side (e.g., anode side and cathode side) are folded onto and secured (e.g., welded) to the others to form comb arrangements 120. The one not folded on each side has the longest length and extends normally away from the end of the electrode assembly 114.

The headspace cage 116 has five lattice-like sides and an open side that is configured to be disposed adjacent to the end of the electrode assembly 114 from which the tabs 118 extend such that the headspace cage 116 surrounds the comb arrangements 120. The headspace cage 116 is thus porous. The tab 118 on each side that extends normally away from the end of the electrode assembly 114 extends through and away from the headspace cage 116, and out of the corresponding pouch.

Figures 2A, 2B:
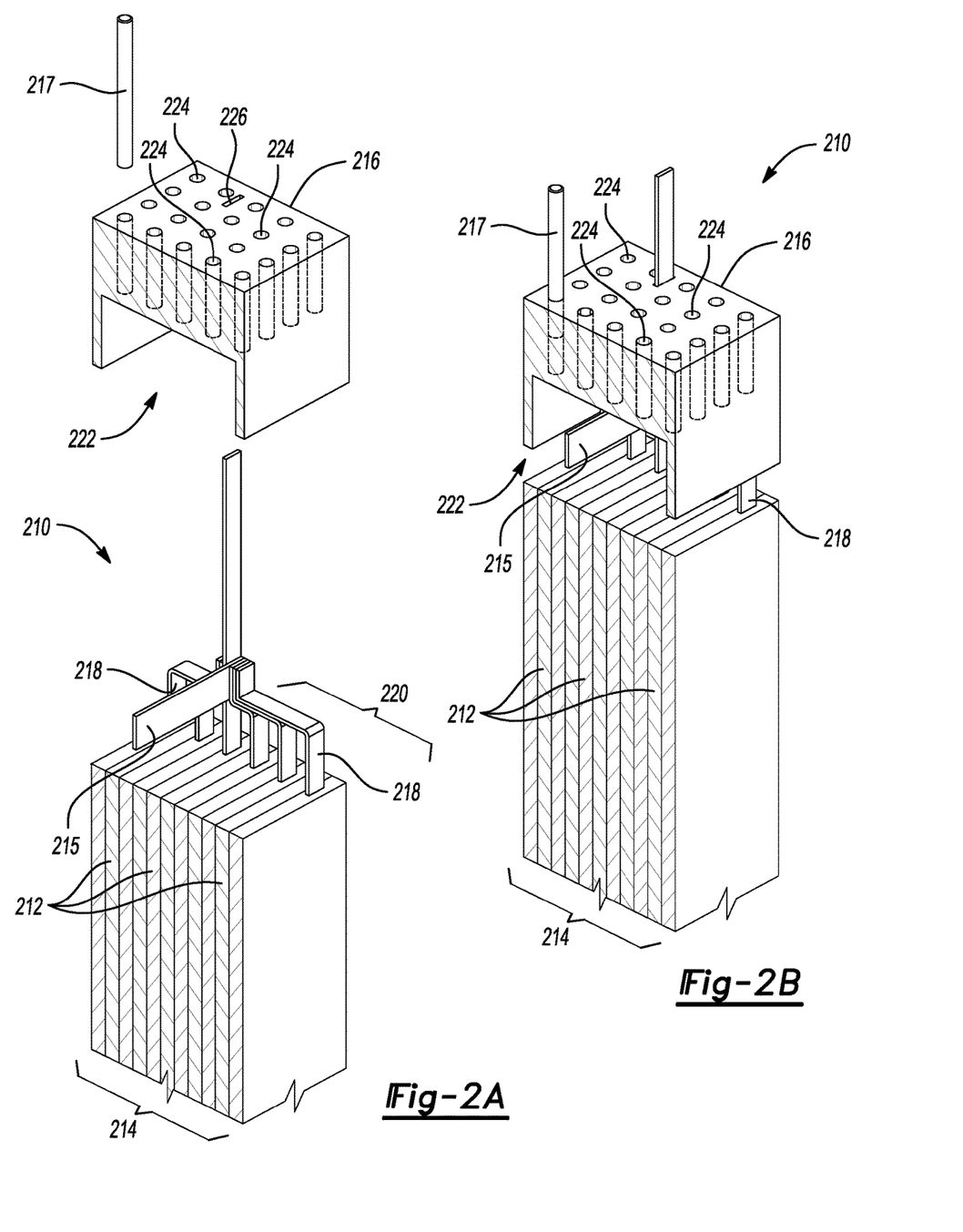
FIGS. 2A and 2B are respectively exploded and assembly views, in cross-section, of a battery cell structure including a headspace block.

Referring to FIGS. 2A and 2B, a battery cell assembly 210 includes a plurality of electrodes 212 stacked to form an electrode assembly 214, a gas recombination device 215, a plastic headspace block 216, and a valve stem 217. The electrodes 212 have a plurality of tabs 218 extending from a same end thereof. Like the example of FIGS. 1A and 1B, the tabs 218 are of different lengths and all but one on each side (e.g., anode side and cathode side) are folded onto and secured (e.g., welded) to the others to form comb arrangements 220. The ones not folded have the longest length and extend normally away from the end of the electrode assembly 214.

The gas recombination device 215 is attached (e.g., welded) to the portions of the tabs 218 that have been folded onto each other, and operates to recombine hydrogen and oxygen during battery charging to water.

The headspace block 216 has an end defining a cavity 222 configured to be disposed adjacent to the end of the electrode assembly 214 from which the tabs 218 extend such that at least a portion of the gas recombination device 215 and comb arrangements 220 occupy the cavity 222. The headspace block 216 also has an opposite end defining a plurality of vias 224 that extend from a surface of the opposite end to the cavity 222 such that gas collected in the cavity 222 may pass through the vias 224 and out of the headspace block 216. The headspace block 216 is thus porous. The headspace block 216 also defines a pair of slots 226 that extend from the surface of the opposite end to the cavity 222 and such that the tabs 218 that extend normally away from the end of the electrode assembly 214 extend through the slots 226, away from the headspace block 216, and out of the corresponding pouch.

The valve stem 217 is press fit into one of the vias 224, and is of sufficient length to extend through the corresponding pouch. It thus provides a path for gas to escape from the pouch. In other arrangements, the valve stem 217 and the one of the vias 224 may be threaded, etc. Other attachment techniques can also be used depending on the construction and/or material used for the headspace member and valve.

Figure 3A:
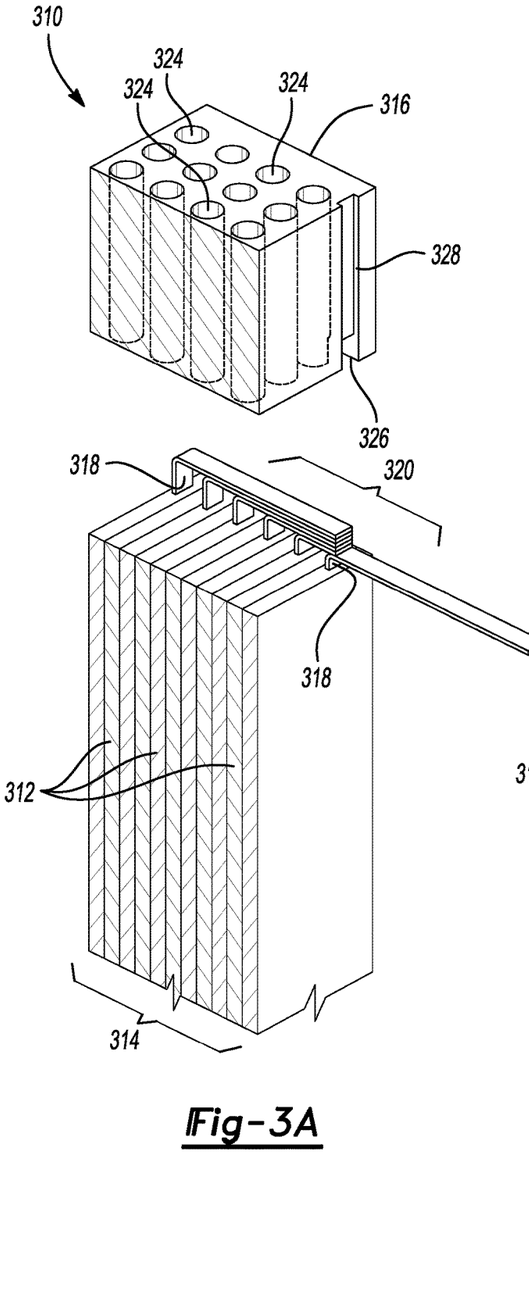
FIGS. 3A and 3B are respectively exploded and assembly views, in cross-section, of another battery cell structure including a headspace block.
Figure 3B:
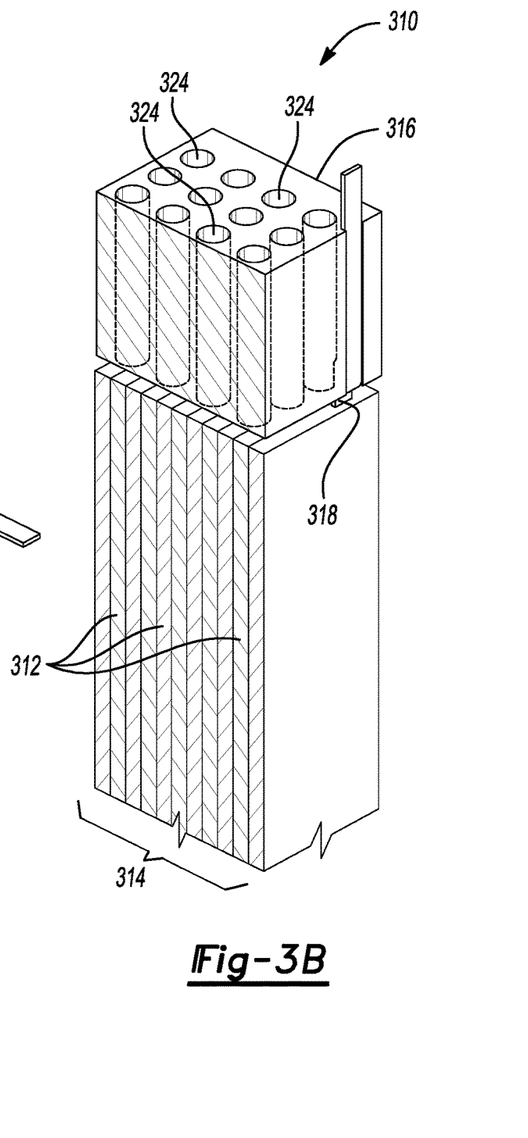

Referring to FIGS. 3A and 3B, a battery cell assembly 310 includes a plurality of electrodes 312 stacked to form an electrode assembly 314, and a headspace block 316. The electrodes 312 have a plurality of tabs 318 extending from a same end thereof. Similar to the examples of FIGS. 1A, 1B, 2A, and 2B, the tabs 318 are of different lengths. In this example however, all on each side (e.g., anode side and cathode side) are folded onto and secured (e.g., welded) to the others to form comb arrangements 320. Once folded and before the headspace block 316 is properly positioned, the longest of the tabs 318 extend in a same direction as the folded portions of the other tabs 318 (FIG. 3A).

The headspace block 316 has an end defining a channel 326 configured to be disposed adjacent to the end of the electrode assembly 314 from which the tabs 318 extend such that at least a portion of the comb arrangements 320 occupy the channels 326. The headspace block 316 also has an opposite end defining a plurality of vias 324 that extend from a surface of the opposite end to the end defining the channel 326 such that gas may pass through the vias 324 and out of the headspace block 316. The headspace block 316 further has a side that defines channels 328 adjacent to and between the previously mentioned end and opposite end. The channels 328 are configured to receive the longest of the tabs 318 as the same are bent around the headspace block 316, with the free ends thereof extending away from the electrode assembly 314 (FIG. 3B) and out of the corresponding pouch. The channels 328 may have a depth such that the longest of the tabs 318 are flush or recessed relative to the side that defines the channels 328.

Figure 4:
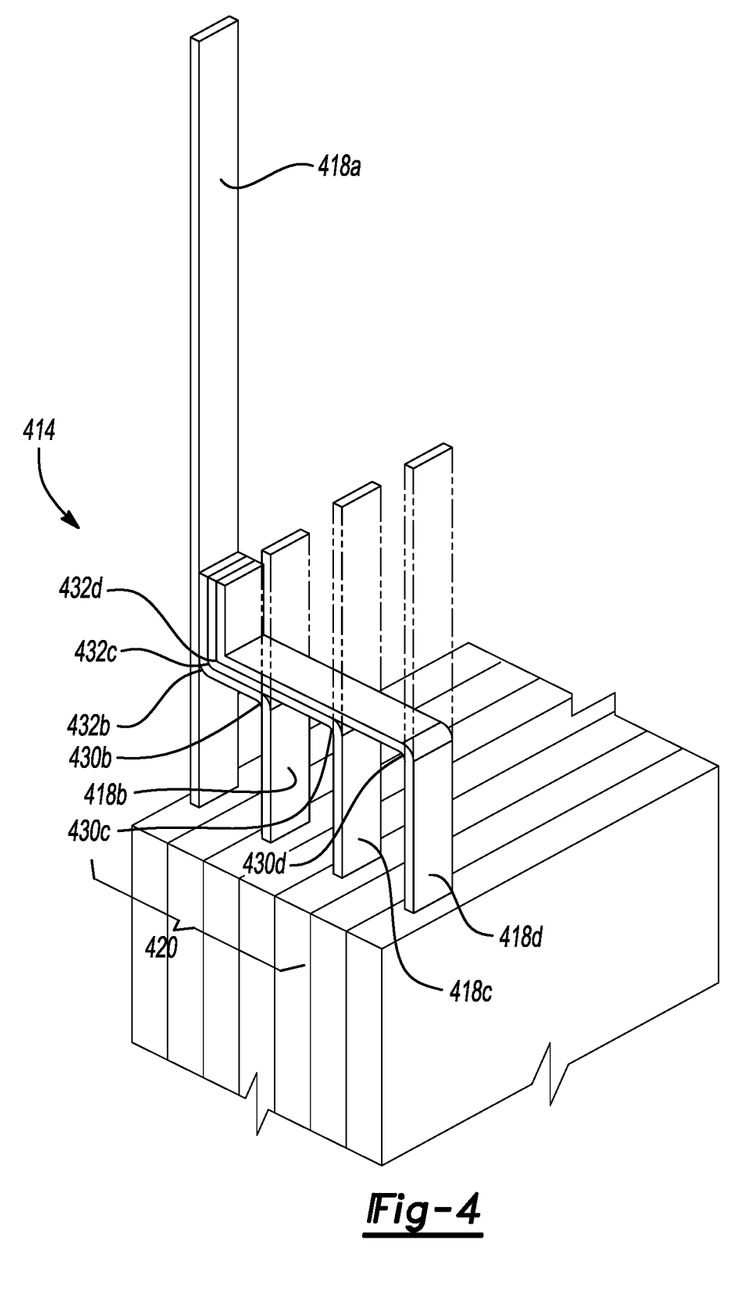
FIG. 4 is a perspective view of a portion of an electrode assembly.

Referring to FIG. 4, an electrode assembly 414 includes a plurality of tabs 418a, 418b, 418c, 418d. The tab 418a is the longest. The tab 418b is the shortest. The tabs 418b, 418c, 418d each have two corresponding bends 430b, 430c, 430d and 432b, 432c, 432d. The tab 418a is not bent and extends normally away from an end of the electrode assembly 414. The bends 430b, 430c, 430d are such that portions of the tabs 418b, 418c, 418d are disposed in a direction perpendicular to the tab 418a and stack on top of each other. The bends 432b, 432c, 432d are such that portions of the tabs 418b, 418c, 418d are disposed in a direction parallel to the tab 418a, continue to stack on top of each other, and are in contact with the tab 418a. The tabs 418a, 418b, 418c, 418d thus form a comb arrangement 420.

Figure 5:
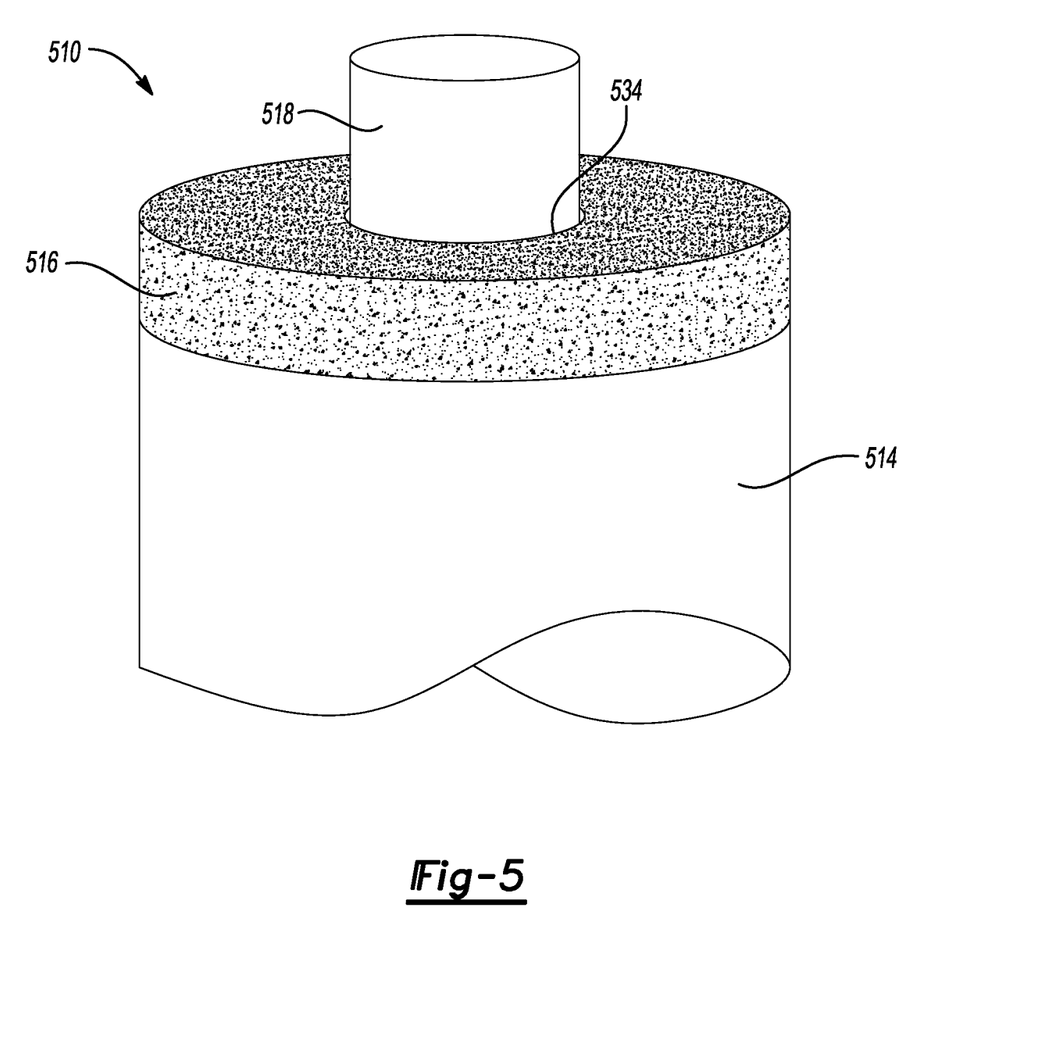
FIG. 5 is an assembly view of yet another battery cell structure including a headspace block.

Referring to FIG. 5, a battery cell assembly 510 includes a cylindrical electrode assembly 514 and a cylindrical metal foam headspace block 516. The headspace block 516 is thus porous. The electrode assembly 514 includes a button tab 518 extending from an end thereof.

The headspace block 516 defines a channel 534 therethrough configured to permit the button tab 518 to pass through and away from the headspace block 516, and out of the corresponding pouch.

Figure 6:
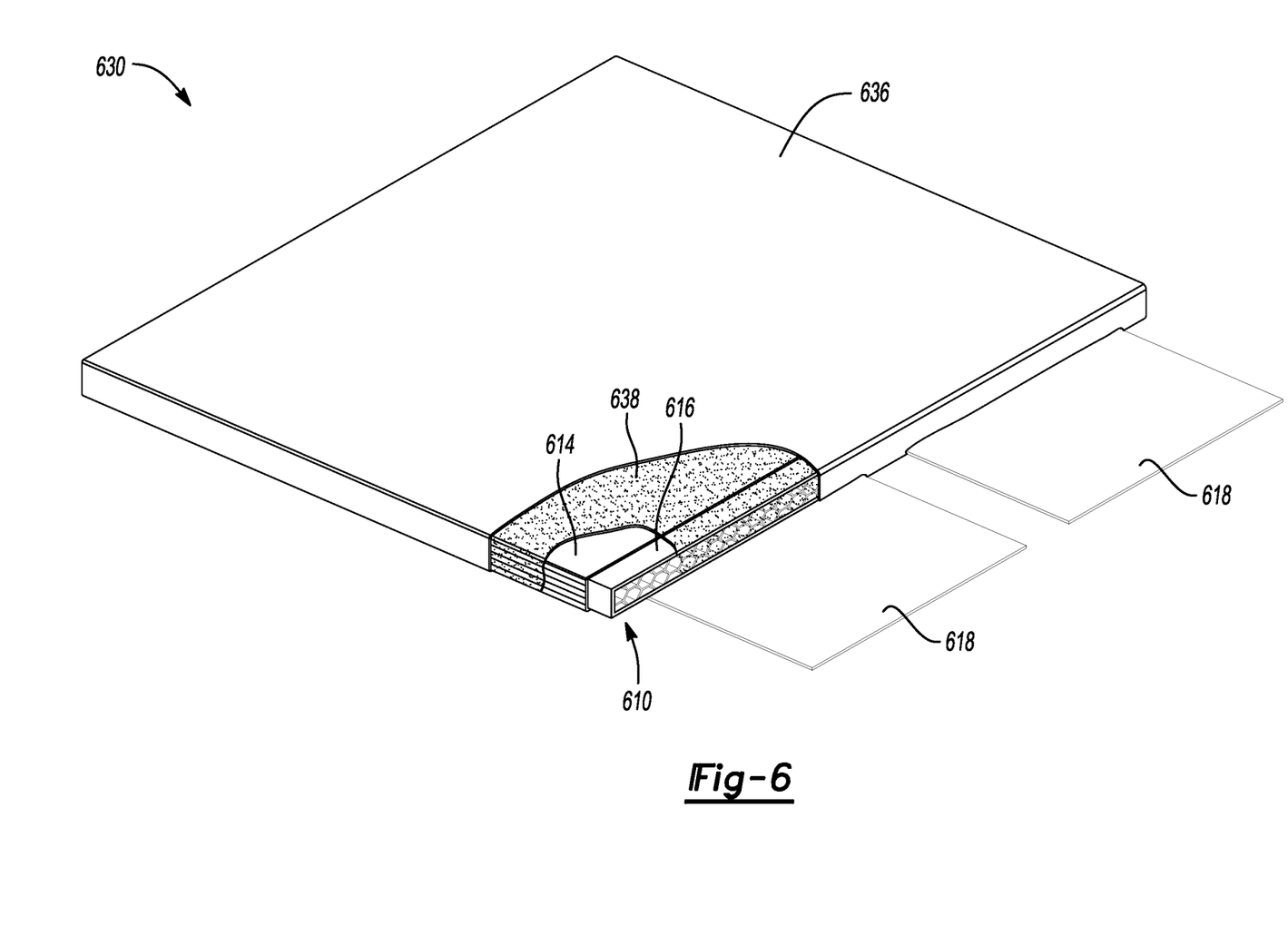
FIG. 6 is an assembly view, in cut-away, of a pouch cell.

Referring to FIG. 6, a pouch cell 630 includes a battery cell 610 contained within a pouch 636. The battery cell 610 includes an electrode assembly 614, a honeycomb head spacer 616, and electrolyte 638. Given its honeycomb structure, the head spacer 616 is thus porous. The electrode assembly 614 includes tabs 618 that extend through and away from the pouch 636. The head spacer 616 is positioned next to an end of the electrode assembly 614 that is adjacent to and in contact with the tabs 618 to maintain a head space within the pouch 636.

While some embodiments are described above, it is not intended that these embodiments describe all possible forms encompassed by the claims. All tabs, for example, may pass through the headspace member and be connected together inside or outside the corresponding pouch. Tabs may be collected together to form a comb arrangement resembling a hand-held fan. Valve stems could be attached (e.g., welded, mechanically fastened, etc.) to cage-like instances of headspace members. The gas recombination device may be attached (e.g., adhered, mechanically fastened, etc.) to the headspace member (e.g., to a wall defining the cavity, to a recessed area within a wall defining the cavity, to an exterior surface of the headspace member, to a recessed area within an exterior surface of the headspace member, etc.). The words used in the specification are words of description rather than limitation, and it is understood that various changes may be made without departing from the spirit and scope of the disclosure.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A battery cell comprising:
    a pouch;
    a porous member disposed within and adjacent to an end of the pouch;
    an electrode assembly disposed within the pouch such that the member spaces the electrode assembly away from the end, and including one or more tabs, at least one of the tabs wrapping around and in contact with an outer surface of the member and out of the pouch; and
    electrolyte contained within the pouch and in contact with the electrode assembly and member.

2. The battery cell of claim 1, wherein the outer surface defines a channel configured to accommodate the at least one of the tabs such that an outer surface of the at least one of the tabs is flush with the outer surface of the porous member or recessed relative to the outer surface of the porous member.

3. The battery cell of claim 1 further comprising a recombination device attached to at least one of the tabs and at least partially contained within the member.

4. The battery cell of claim 1 further comprising a recombination device attached to the member.

5. The battery cell of claim 1, wherein the member is a scaffold, felt, foam, or sponge.

* * * * *